United States Patent [19]
Chen et al.

[11] Patent Number: 5,943,604
[45] Date of Patent: Aug. 24, 1999

[54] ECHO DEVICE METHOD FOR LOCATING UPSTREAM INGRESS NOISE GAPS AT CABLE TELEVISION HEAD ENDS

[75] Inventors: Wei-Sing Chen, Fremont; Guenter E. Roeck, San Jose, both of Calif.

[73] Assignee: Cisco Technology, Inc., San Jose, Calif.

[21] Appl. No.: 08/962,231

[22] Filed: Oct. 31, 1997

[51] Int. Cl.$^6$ .............. H04H 1/02; H04N 7/14; H04N 17/00
[52] U.S. Cl. .............. 455/5.1; 348/12; 348/193; 370/248
[58] Field of Search .............. 455/3.1, 4.1, 4.2, 455/5.1, 6.1, 6.2; 348/6, 7, 10, 12, 13, 180, 181, 192, 193; 370/248, 249; 379/5

[56] References Cited

U.S. PATENT DOCUMENTS

| | | | |
|---|---|---|---|
| 5,225,902 | 7/1993 | McMullan, Jr. | 348/12 |
| 5,729,824 | 3/1998 | O'Neill et al. | 455/3.1 |
| 5,790,523 | 8/1998 | Ritchie, Jr. et al. | 455/3.1 |

OTHER PUBLICATIONS

ANSI ®, "Carrier–to–Customer Installation—DS1 Metallic Interface", *American National Standard for Telecommunications*, T1.403 (1989).

Rogers Engineering, "Two–Way CATV Plant Characterization Test Procedures" *Test Procedures for Two–Way CATV Plant Characterization*, p. 8 (1993).

R.P.C. Wolters, "Characteristics of Upstream Channel Noise in CATV–Networks", *IEEE Transactions on Broadcasting*, vol. 42, No. 4, pp. 328–332 (1996).

Ulm, et al., "Data–Over–Cable Service Interface Specification", *Radio Frequency Interface Specification*, No. 102–971008, (1997).

*Primary Examiner*—Andrew I. Faile
*Assistant Examiner*—John W. Miller
*Attorney, Agent, or Firm*—Beyer & Weaver, LLP

[57] ABSTRACT

A system and method for locating ingress noise gaps for an upstream data carrier in a cable network utilizing cable modems is described. A system for identifying a transmission frequency that has less noise than other available frequency bands includes a packet generator, a rate controller, an echo device, a demodulator, and a packet checker. The packet generator and rate controller, contained in a cable modem termination system, send test data downstream to the echo device which then redirects the test data upstream at a selected test frequency. The echo device, which may be located within the cable modem termination system or outside the termination system, listens on the downstream path for data packets addressed to it. Once received, the echo changes the address of the test data to the address of the packet checker. The packet checker then recieves and analyzes the test data packet sent from the echo device to assess the amount of noise on that particular test frequency. The echo device can be a subscriber cable data modem configured to receive test packets sent downstream or a custom-built device located anywhere on the downstream path or within the cable modem termination system.

30 Claims, 7 Drawing Sheets

ECHO DEVICE METHOD FOR LOCATING UPSTREAM INGRESS NOISE GAPS AT CABLE TELEVISION HEAD ENDS

BACKGROUND OF THE INVENTION

1. Field of Invention

The present invention relates generally to methods and apparatus for transmitting digital data in cable television network systems. More specifically, the present invention relates to methods and apparatus for locating upstream ingress noise gaps for cable modems.

2. Background

The cable TV industry has been upgrading its signal distribution and transmission infrastructure since the late 1980s. In many cable television markets, the infrastructure and topology of cable systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable head end, i.e. a distribution hub, which received analog signals for broadcast from various sources such as satellites, broadcast transmissions, or local TV studios. Coaxial cable from the head end was connected to multiple distribution nodes, each of which could supply many houses or subscribers. From the distribution nodes, trunk lines (linear sections of coaxial cable) extended toward remote sites on the cable network. A typical trunk line is about 10 kilometers. Branching off of these trunk lines were distribution or feeder cables (40% of the system's cable footage) to specific neighborhoods, and drop cables (45% of the system's cable footage) to homes receiving cable television. Amplifiers were provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the head end of a particular cable system is broadcast to all subscribers on that cable system. The subscriber simply needed a television with an appropriate cable receptor to receive the cable television signal. The cable TV signal was broadcast at a radio frequency range of about 60 to 700 MHz. Broadcast signals were sent downstream; that is, from the head end of the cable system across the distribution nodes, over the trunk line, to feeder lines that led to the subscribers. However, the cable system did not have installed the equipment necessary for sending signals from subscribers to the head end, known as return or upstream signal transmission. Not surprisingly, nor were there provisions for digital signal transmission either downstream or upstream.

In the 1980s, cable companies began installing optical fibers between the head end of the cable system and distribution nodes (discussed in greater detail with respect to FIG. 1 below). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be upto 80 kilometers, whereas a typical coaxial trunk line is about 10 kilometers, as mentioned above. Prior to the 1990s, cable television systems were not intended to be general-purpose communications mechanisms. Their primary purpose was transmitting a variety of entertainment television signals to subscribers. Thus, they needed to be one-way transmission paths from a central location, known as the head end, to each subscriber's home, delivering essentially the same signals to each subscriber. HFC systems run fiber deep into the cable TV network offering subscribers more neighborhood specific programming by segmenting an existing system into individual serving areas between 500 to 2,000 subscribers. Although networks using exclusively fiber optics would be optimal, presently cable networks equipped with HFC configurations are capable of delivering a variety of high bandwidth, interactive services to homes for significantly lower costs than networks using only fiber optic cables.

Figure 1:
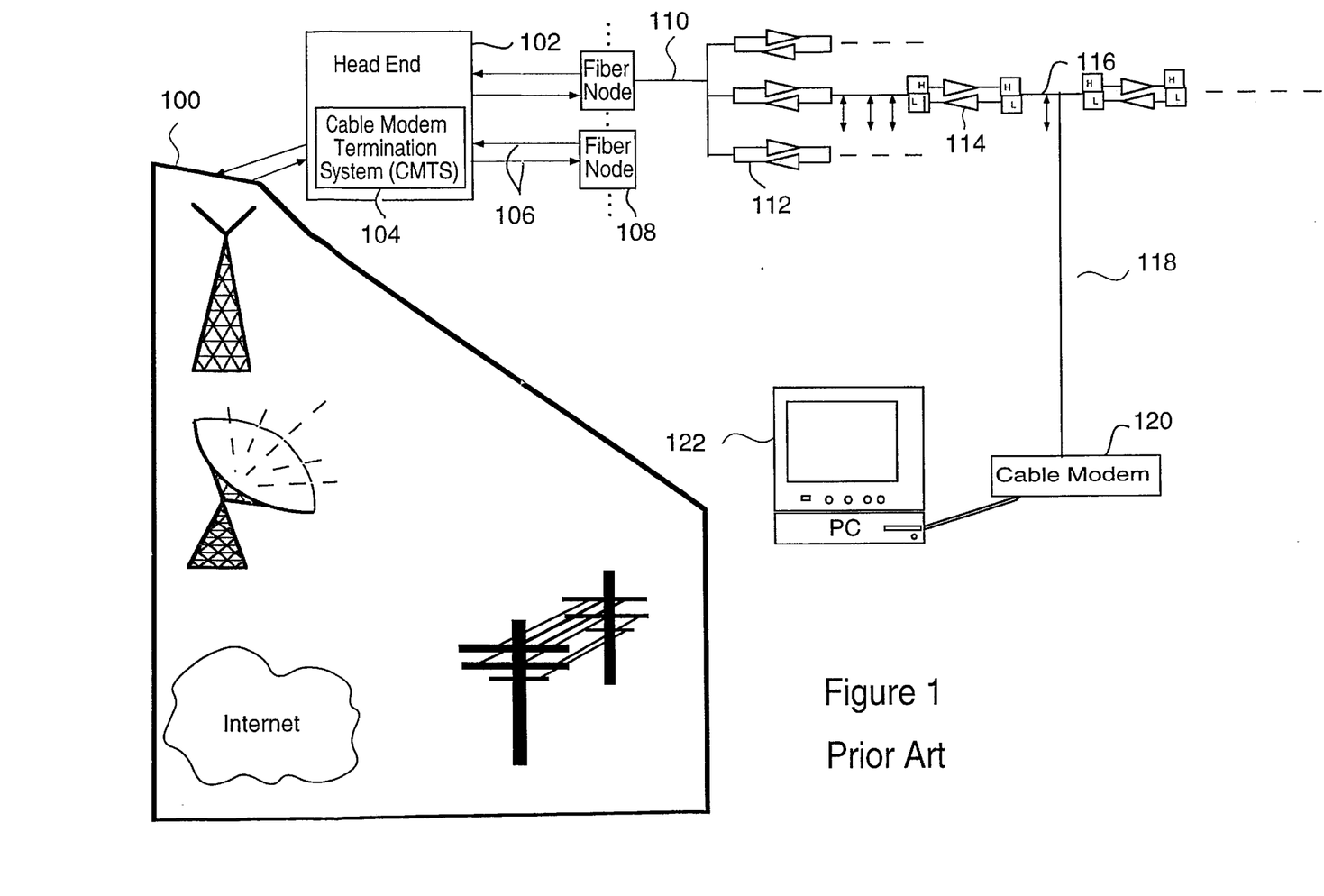
FIG. 1 is a block diagram of a prior art two-way hybrid fiber-coaxial (HFC) cable system utilizing a cable modem data transmission.

FIG. 1 is a block diagram of a two-way hybrid fiber-coaxial (HFC) cable system utilizing a cable modem for data transmission. It shows a head end 102 (essentially a distribution hub) which can typically service about 40,000 subscribers. Head end 102 contains a cable modem termination system (CMTS) 104 that is needed when transmitting and receiving data using cable modems. CMTS 104 is discussed in greater detail with respect to FIG. 2. Head end 102 is connected through pairs of fiber optic lines 106 (one line for each direction) to a series of fiber nodes 108. Each head end can support normally up to 80 fiber nodes. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112 which permit certain frequencies to go in one direction and other frequencies to go in the opposite direction (frequency ranges for upstream and downstream paths are discussed below). Each fiber node 108 can normally service up to 500 subscribers. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data. The data may be Internet data, digital audio, or digital video data, in MPEG format, for example, from one or more external sources 100. Using two-way HFC cable systems for transmitting digital data is attractive for a number of reasons. Most notably, they provide upto a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 33,600 bits per second (bps) using commercial (and widely used) data modems for personal computers. Using a two-way HFC system as shown in FIG. 1 with cable modems, data may be transferred at speeds up to 10 million bps. Table 1 is a comparison of transmission times for transmitting a 500 kilobyte image over the Internet.

TABLE 1

Time to Transmit a Single 500 kbyte Image

| Telephone Modem (28.8 kbps) | 6–8 minutes |
| ISDN Line (64 kbps) | 1–1.5 minutes |
| Cable Modem (30 Mbps) | 1 second |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect head ends to fiber nodes and, in some instances, to also use them in the trunk lines of the coaxial distribution system. In way of background, optical fiber is constructed from thin strands of glass that carry signals longer distances and faster than either coaxial cable or the twisted pair copper wire used by telephone companies. Fiber optic lines allow signals to be carried much greater distances without the use of amplifiers (item 114 of FIG. 1). Amplifiers decrease a cable system's channel capacity, degrade the signal quality, and are susceptible to high maintenance costs. Thus, distribution systems that use fiber optics need fewer amplifiers to maintain better signal quality.

In cable systems, digital data is carried over radio frequency (RF) carrier signals. Cable modems are devices that convert digital data to a modulated RF signal and convert the RF signal back to digital form. The conversion is done at two points: at the subscriber's home by a cable modem and by a CMTS located at the head end. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal (it is helpful to keep in mind that the word "modem" is derived from modulator/demodulator). Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been an increased focus on performance, reliability, and improved maintenance of such systems. In sum, cable companies are in the midst of a transition from their traditional core business of entertainment video programming to a position as a full service provider of video, voice and data telecommunication services. Among the elements that have made this transition possible are technologies such as the cable modem.

A problem common to all upstream data transmission on cable systems, i.e. transmissions from the cable modem in the home back to the head end, is ingress noise at the head end which lowers the signal-to-noise ratio, also referred to as carrier-to-noise ratio. Ingress noise can result from numerous internal and external sources. Sources of noise internal to the cable system may include cable television network equipment, subscriber terminals (televisions, VCRs, cable modems, etc.), intermodular signals resulting from corroded cable termini, and core connections. Significant sources of noise external to the cable system include home appliances, welding machines, automobile ignition systems, and radio broadcast, e.g. citizen band and ham radio transmissions. All of these ingress noise sources enter the cable system through defects in the coaxial cable line, which acts essentially as a long antenna. Ultimately, when cable systems are entirely optical fiber, ingress noise will be a far less significant problem. However, until that time, ingress noise is and will continue to be a problem with upstream transmissions.

The portion of bandwidth reserved for upstream signals is normally in the 5 to 42 MHz range. Some of this frequency band may be allocated for set-top boxes, pay-per-view, and other services provided over the cable system. Thus, a cable modem may only be entitled to some fraction (i.e., a "sub-band") such as 1.6 MHz, within a frequency range of frequencies referred to as its "allotted band slice" of the entire upstream frequency band (5 to 42 MHz). This portion of the spectrum—from 5 to 42 MHz—is particularly subject to ingress noise and other types of interference. Thus, cable systems offering two-way data services must be designed to operate given these conditions.

Although not fully agreed to by all parties in the cable TV and cable modem industry, an emerging standard establishing the protocol for two-way communication of digital data on cable systems has been defined by a consortium of industry groups. The protocol, known as the Multimedia Cable Network System (MCNS), specifies particular standards regarding the transmission of data over cable systems. With regard to the sub-band mentioned above, MCNS specifies that the bandwidth of a data carrier should generally be 200 KHz to 3.2 MHz. Further references to MCNS standards will be made in the specification.

As noted above, ingress noise, typically narrow band, e.g., less than 100 KHz, is a general noise pattern found in cable systems. Upstream channel noise resulting from ingress noise adversely impacts upstream data transmission by reducing data throughput and interrupting service, thereby adversely affecting performance and efficient maintenance. One strategy to deal with cable modem ingress noise is to position the modem's upstream data carrier in an ingress noise gap where ingress noise is determined to be low, such as between radio transmission bands. The goal is to position data carriers to avoid already allocated areas.

Ingress noise varies with time, but tends to accumulate over the system and gathers at the head end. In addition, while a particular frequency band may have been appropriate for upstream transmissions at the beginning of a transmission, it may later be unacceptably noisy for carrying a signal. Therefore, a cable system must attempt to identify noisy frequency bands and locate optimal or better bands for upstream transmission of data at a given time.

Block 104 of FIG. 1 represents a cable modem termination system connected to a fiber node 108 by pairs of optical fibers 106. The primary functions of the CMTS are (1) receiving signals from external sources 100 and converting the format of those signals, e.g., microwave signals to electrical signals suitable for transmission over the cable system; (2) providing appropriate MAC level packet headers (as specified by the MCNS standard discussed below) for data received by the cable system, (3) modulating and demodulating the data to and from the cable system, and (4) converting the electrical signal in the CMTS to an optical signal for transmission over the optical lines to the fiber nodes.

Figure 2:
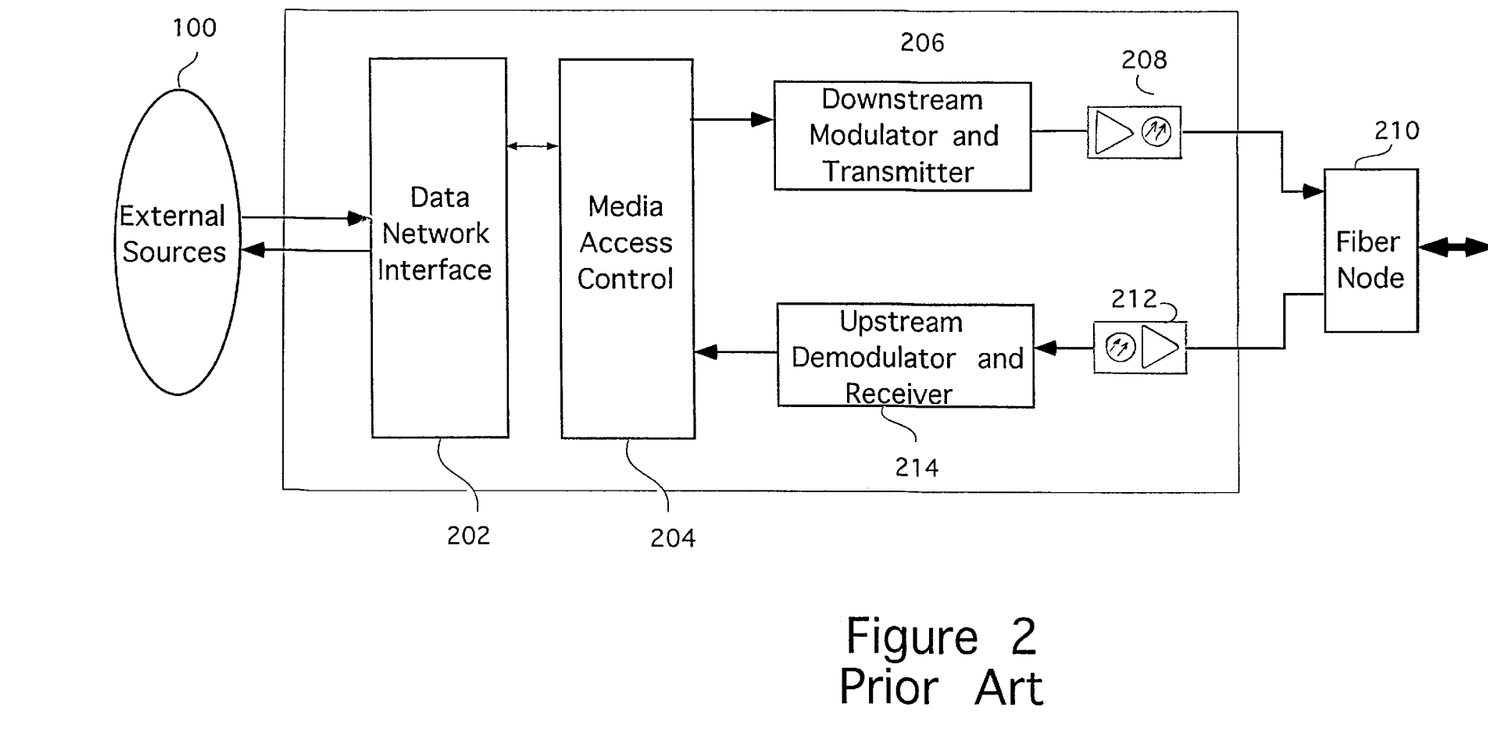
FIG. 2 is a block diagram showing the prior art basic components of a cable modem termination system.

FIG. 2 is a block diagram showing the basic components of a cable modem termination system (item 104 of FIG. 1). Data Network Interface 202 is an interface component between an external data source and the cable system. External data sources (item 100 of FIG. 1) transmit data to data network interface 202 via optical fiber, microwave link, satellite link, or through various other media. A Media Access Control Block (MAC Block) 204 receives data packets from a Data Network Interface 202. Its primary purpose is to encapsulate a MAC header according to the MCNS standard containing an address of a cable modem to the data packets. MAC Block 204 contains the necessary logic to encapsulate data with the appropriate MAC addresses of the cable modems on the system. Each cable modem on the system has its own MAC address. Whenever a new cable modem is installed, its address must be registered with MAC Block 204. The MAC address is necessary to distinguish data from the cable modems since all the modems share a common upstream path, and so that the system knows where to send data. Thus, data packets, regardless of format, must be mapped to a particular MAC address.

MAC Block 204 also provides ranging information addressed to each cable modem on its system. The ranging information can be either timing information or power information. MAC Block 204 transmits data via a one-way communication medium to a Downstream Modulator and Transmitter 206. Downstream modulator and transmitter 206 takes the packet structure and puts it on the downstream carrier. It translates the bits in the packet structure to 64 QAM in the downstream (and 16 QAM or quadrature phase shift keying (QPSK) is used on the upstream path). These modulation methods are known in the art and are also specified in the MCNS protocol. It should be noted that optical fibers transmit data in one direction and coaxial cables can transmit data in two directions. Thus, there is only one coaxial cable leaving the fiber node which is used to send and receive data, whereas there are two optical fiber lines from the fiber node to the downstream and upstream modulators.

Downstream Modulator and Transmitter 206 converts the digital data packets to modulated downstream RF frames, such as MPEG or ATM frames, using quadrature amplitude modulation, e.g. 64 QAM, forward error correcting (FEC) code, and packet interleaving. Converter 208 converts the modulated RF electrical signals to optical signals that can be received and transmitted by a Fiber Node 210. Each Fiber Node 210 can generally service about 500 subscribers. Converter 212 converts optical signals transmitted by Fiber Node 210 to electrical signals that can be processed by an Upstream Demodulator and Receiver 214. This component demodulates the upstream RP signal (in the 5–42 Mhz range) using, for example, 16 QAM or QPSK. It then sends the digital data to MAC 204.

A prior art method of locating an area of lower noise in an upstream path involves arbitrarily selecting frequencies from a frequency list as soon as the noise for a current frequency becomes unacceptable. The frequencies may be chosen using a round robin or other selection methodology. Another method involves deploying a spectrum analyzer to locate an appropriate frequency in a single pass. The first blind "round robin" method of picking a frequency from a frequency list (also referred to as dynamic frequency agility) is slow in locating an ingress noise gap since it requires going through many frequencies before a frequency with an acceptable noise level is located. It also involves changing upstream data carrier frequencies without measuring or comparing error levels of the different frequencies before choosing a particular frequency. Implementing the other method of using a spectrum analyzer is costly. It involves measuring power levels in the entire frequency spectrum using a single sweep and identifying ingress noise gaps as power minimas at the head end. Another method utilizes a "gate" that keeps the return path from an individual subscriber closed except for those times when the subscriber actually sends a return signal upstream. This would require knowing when the subscriber will send a return signal or any signal upstream.

Therefore, what is needed is a reliable, efficient, and cost-effective method of locating upstream ingress noise gaps, thereby enabling deliberate and intelligent placement of an upstream data carrier in a cable network system utilizing cable modems.

SUMMARY OF THE INVENTION

To achieve the foregoing and other objects, and in accordance with the purpose of the present invention, a system and method for locating ingress noise gaps for an upstream data carrier in a cable network utilizing cable modems. In one preferred embodiment, a system for identifying a transmission frequency that has less noise than other available frequency bands includes a packet generator, a rate controller, an echo device, a demodulator, and a packet checker. The echo device receives test data packets sent downstream by the packet generator and rate controller and redirects it upstream at a selected test frequency. The packet checker then receives and analyzes the test packet sent from the echo device to assess the amount of noise on that particular test frequency. In a preferred embodiment, the echo device is a subscriber cable data modem configured to receive a test packet sent downstream and redirecting it upstream at a selected test frequency.

In another preferred embodiment, the echo device includes a media access control address, a downstream receiver and demodulator, an echo logic device, and an upstream modulating and transmitting mechanism. The echo logic device replaces the echo device's media access control address with the address of the packet checker thereby redirecting the otherwise unmodified test data packet to the packet checker.

In another aspect of the invention, a method of locating a transmission frequency that has relatively less noise than other frequencies for transmitting digital data upstream in a cable system is described. Test data is transmitted downstream at a downstream frequency and addressed to an echo device located downstream. The test data is received by the echo device and sent back to a test data checker at a test frequency. A noise level associated with the test frequency is determined by evaluating the test data once it is received by the test data checker.

In another preferred embodiment, the noise level is determined by examining the number of errors in the test data and calculating the signal-to-noise ratio for the test frequency.

BRIEF DESCRIPTION OF THE DRAWINGS

The invention, together with further aspects, features and advantages thereof will be more clearly understood from the following description considered in connection with the accompanying drawings in which like elements bear the same reference numerals throughout the various Figures.

DETAILED DESCRIPTION OF THE INVENTION

Important issues regarding the expansion of the existing cable system infrastructure to include full service two-way communication of digital data are reliability, low maintenance, and data integrity. The service must have low maintenance costs and must not alter data unintentionally during transmission. A high rate of data integrity is extremely important to most users. One way data is affected during transmission is by ingress noise, particularly on the upstream data path. The present methods for detecting unacceptable noise levels and locating an acceptable noise level are too slow or too costly. The present invention addresses the issue of data integrity on locating ingress noise gaps on the upstream data path where the upstream RF signal can be placed so that the carrier-to-noise ratio is optimized. It may accomplish this by adding components to a conventional CMTS (described with respect to FIG. 2) and placing a custom echo device either internally or externally of the CMTS. A preferred embodiment of the alterations to the CMTS is shown in FIG. 3.

Figure 3:
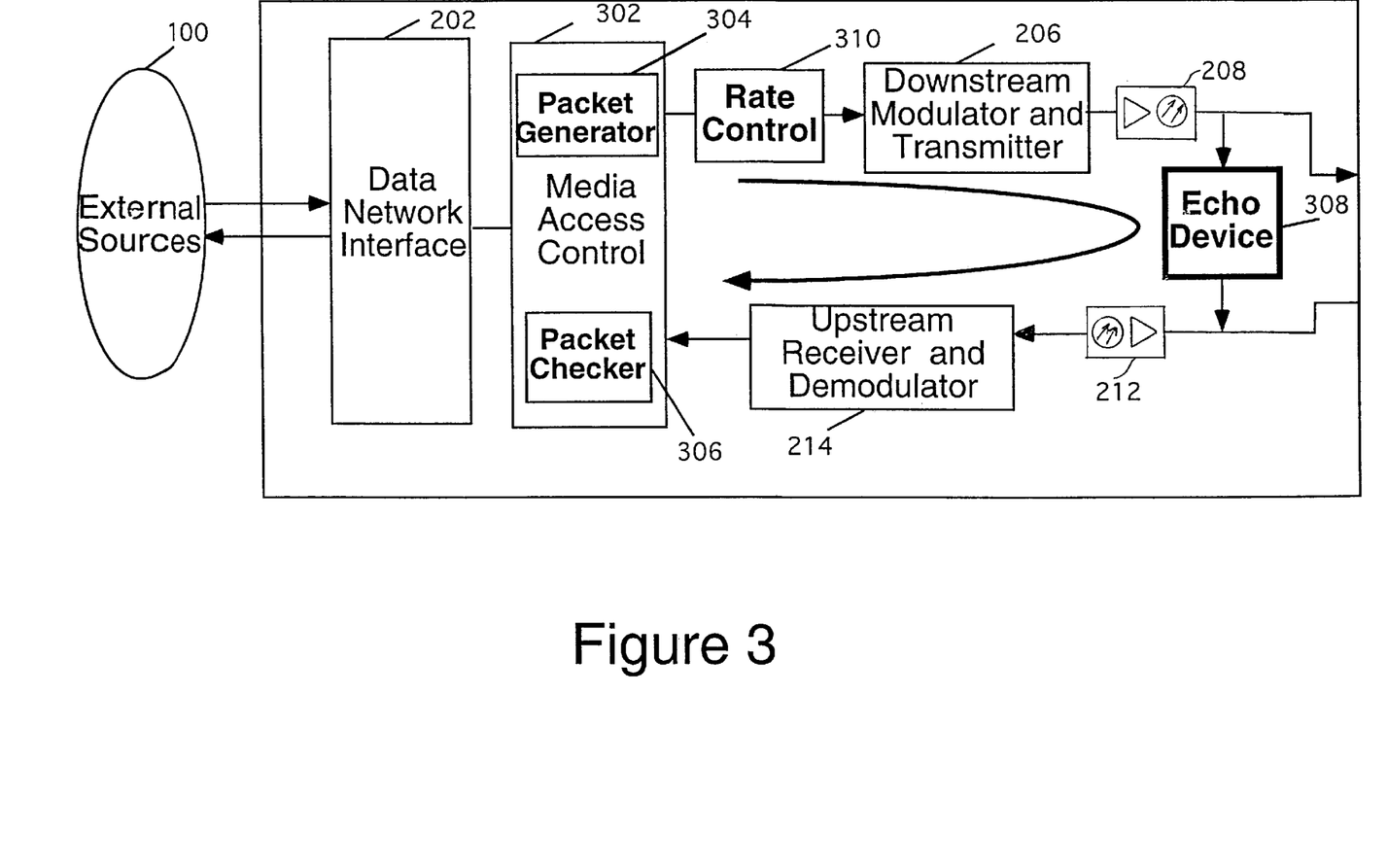
FIG. 3 is a block diagram showing a cable modem termination system altered for conducting asymmetric echo loop testing of the described embodiment of the present invention.

FIG. 3 is a block diagram showing a cable modem termination system altered for conducting asymmetric echo loop testing. In addition to the components described with respect to FIG. 2, i.e., the data network interface, the MAC Block, downstream modulator and upstream demodulator, FIG. 3 includes additional components used for echo loop testing in the described embodiment. Specifically, it includes a modified MAC (Media Access Control) Block 302 containing two new components: a packet generator 304 and a packet checker 306.

Figure 5:
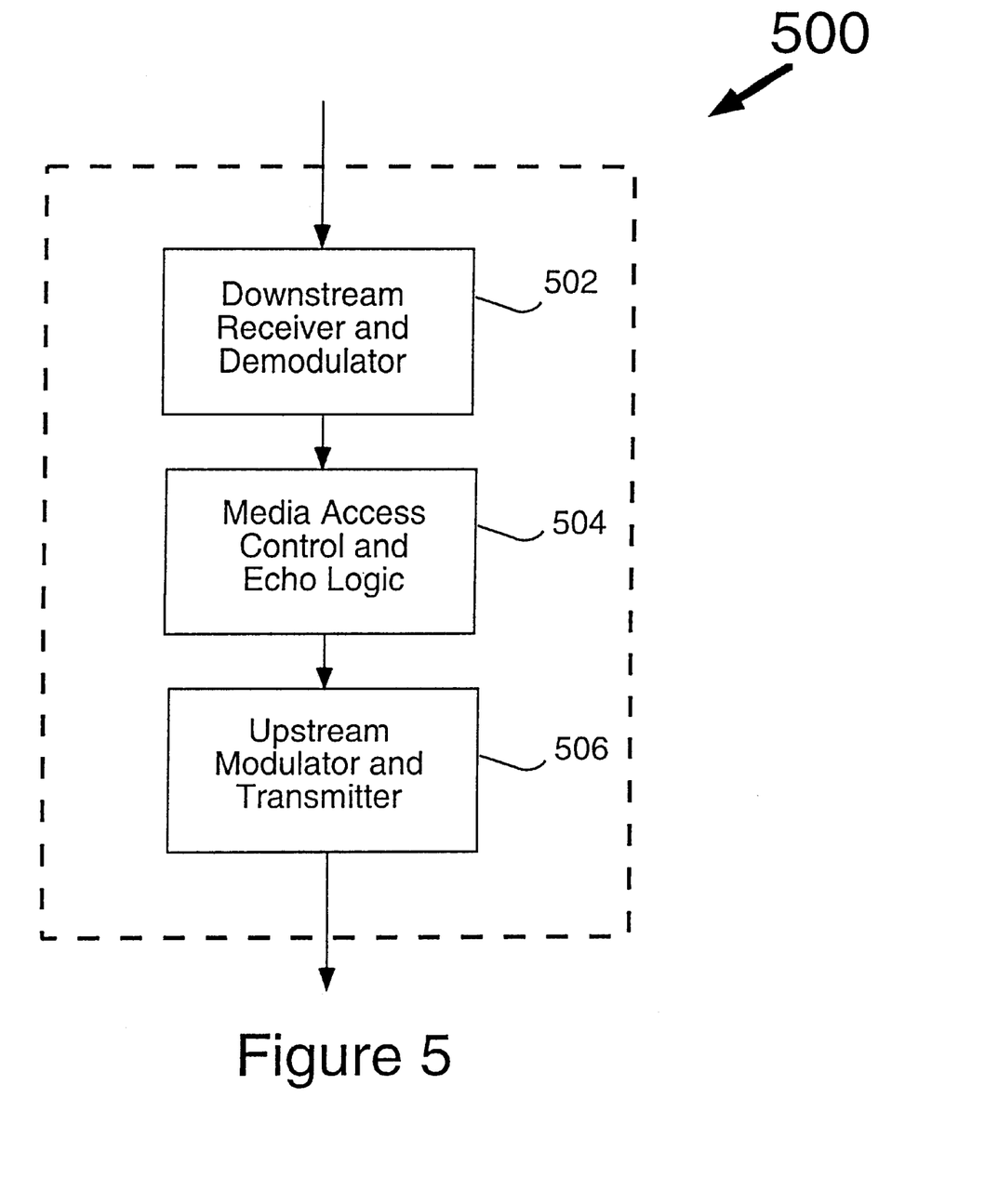
FIG. 5 shows the internal functional components of an echo device used in the described embodiment.

Packet generator 304 creates data packets addressed to a specialized cable modem referred to as an echo device 308 (described in further detail with respect to FIG. 5). The test data packet size and payload may be varied depending on what type of test is being conducted, e.g., a test using an ICMP (Internet Control Message Protocol) test data packet or a test using a DFT (Design For Test Protocol) test data packet (both using 32-bit data packets). The packet generator essentially takes a bit stream which is used in telephony testing and breaks up the bitstream to create the test data packets. It then assigns to each data packet a MAC address for echo device 308. The bit stream may be a quasi-random sequence of bits. In another preferred embodiment, IP ping packets can be used to create test data packets. The type of data packet depends on what kind of test is being performed. The bit patterns of the packets generated by the packet generator may be chosen to be a pattern that is highly susceptible to noise. However, this may be difficult given that in standard media access control circuitry the MAC sometimes scrambles data in the packets to promote proper encoding of the signal in QAM format. In addition, the MAC may interleave bits in the data packet.

A rate controller 310 reduces the data packet rate on the downstream path so that it matches that of the upstream path. Rate controller 310 is necessary in the described embodiment due to the asymmetric nature of the system. Echo loop testing requires some form of rate control in the downstream to avoid overflowing the upstream path in the described embodiment. The frequency of the downstream path is in the 50 to 860 MHz range and transmits data at a rate upto 30 Mbps while the frequency of the upstream path is in the 5 to 42 Mhz range and carries data closer to 1.3 Mbps. In the described embodiment, rate controller 310 provides the necessary control by filling excess bandwidth on the upstream path with non-data bits or packets not associated with the loop test. This is necessary to prevent the inevitable loss of test data packets that would occur if the upstream carrier could not transmit all the data packets being sent on the downstream path. In other preferred embodiments, rate controller 310 can simply send groups of IP ping packets and wait for their return before sending more packets. In yet other preferred embodiments, it can involve more sophisticated software and hardware techniques for throttling the downstream packet rate. While rate controller 310 is shown as a separate entity within the CMTS, it may be provided at other locations. For example, in another preferred embodiment it may be located within MAC 302.

Echo device 308 may be a custom-built device or simply a normal cable modem. In either case, echo device 308 is registered with MAC block 302 and has its own MAC address. It listens on the downstream path for data packets with its address. In the described embodiment echo device 308 is located in the CMTS as shown in FIG. 3. Thus, the device is contained in the CMTS's physical enclosure and is implemented as part of the hardware. It should be noted that packet generator 304, packet checker 306, and rate controller 310 can be implemented as software on existing hardware components of the CMTS (e.g. MAC block 302). However, echo device 308 should be implemented in hardware in the described embodiment because it needs to provide its own MAC address at a location downstream from packet generator 304 and rate controller 310.

Figure 4:
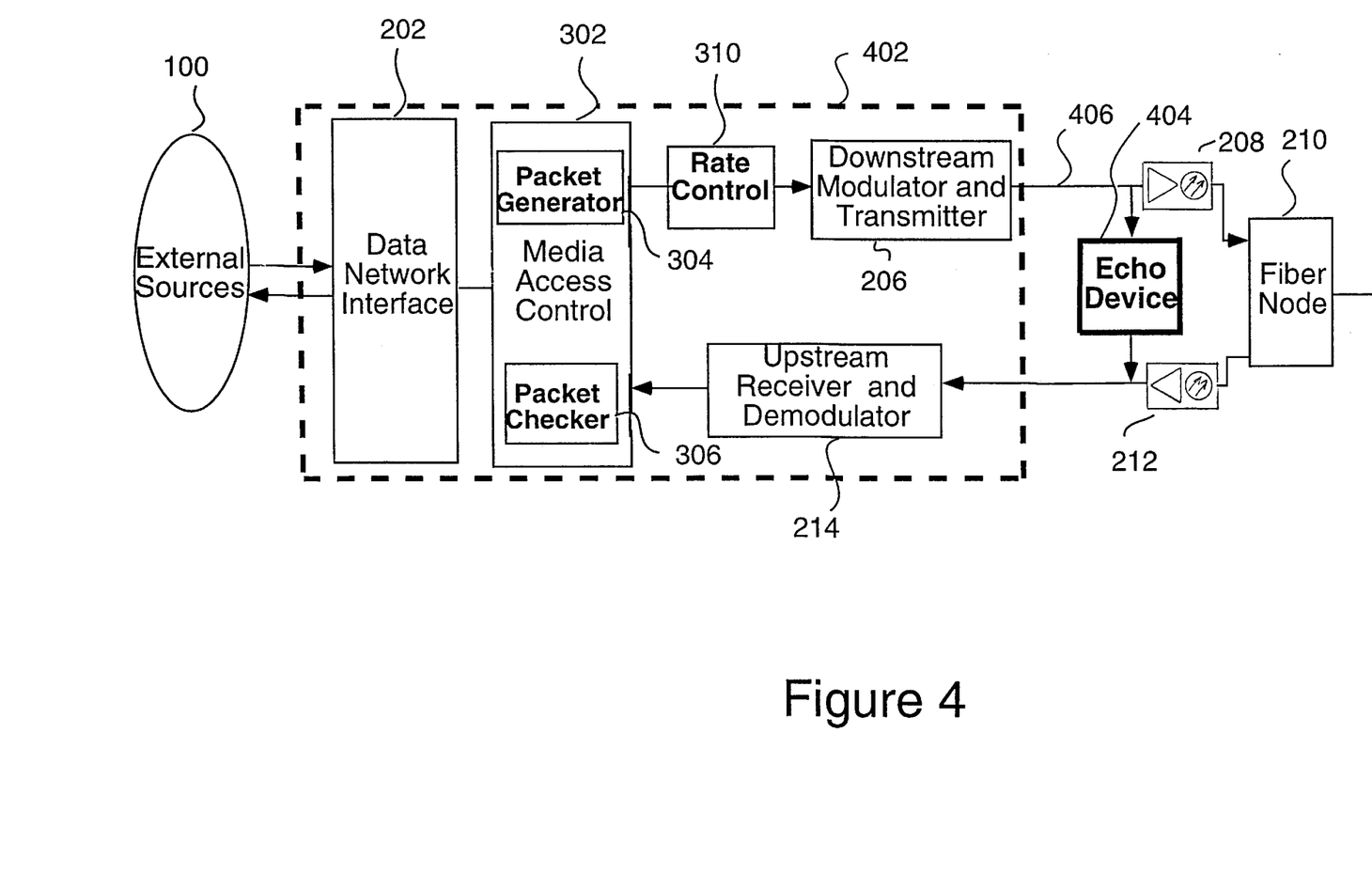
FIG. 4 is a block diagram showing a CMTS and an echo device located outside the CMTS.

FIG. 4 is a block diagram showing an echo device 404 located outside a CMTS 402. In this preferred embodiment, echo device 404 is implemented as a hardware device installed on the cable system. External echo device 404 can be located at any point on a downstream path 406. In another preferred embodiment, the echo device can receive data in radio frequencies or intermediate frequencies which are more manageable. An amplifier (not shown) converts the intermediate frequencies to radio frequencies at a point downstream from the echo device. Intermediate frequency output is preferable because it allows the elimination of RF circuitry from a noisy digital board.

In yet another preferred embodiment, echo device 404 is simply a cable modem installed at a subscriber's premises. In this embodiment, the device would most likely be dedicated to echo loop testing so that it does not interfere with the user's normal two-way digital communications. The dedicated echo device/cable modem will, as usual, have its own MAC address so that it receives only test data packets from the packet generator and, after changing the source and destination MAC addresses will send the same data packet back to the packet checker. The echo device essentially listens for downstream packets addressed to it and repackages those packets for transmission upstream to packet checker 306. As always, the packet generator generates test packets for the loop test that are addressed to the echo device. In preferred embodiments where the cable modem is external of the CMTS, the cable modem need not be physically installed at a subscriber's premises, but may be placed anywhere downstream from the CMTS on the cable system.

Regardless of the echo device's location, test data packets are received and analyzed by packet checker 306. It verifies that the data packets received match the data packets transmitted. Packet checker 306 accumulates error statistics such as bit error rates (BER), FEC block statistics, and packet error statistics. Once the echo loop test is established, the upstream carrier frequency is periodically changed at the upstream receiver and demodulator 312 and correspondingly at the echo device so that error statistics may be gathered at packet checker 306 for different frequencies between 5 and 42 MHz. The downstream carrier may remain at a fixed frequency during this particular process. Error statistics are sampled for a finite length of time, ΔT, which indicates the time between changes in frequency (this defined time period is discussed with respect to FIG. 6B). These error statistics are accumulated for each upstream carrier band within sampling period ΔT. An ingress noise gap is identified when data loss is below a specified maximum limit.

FIG. 5 shows the primary internal functional components of an echo device used in a preferred embodiment. The device receives radio frequencies in the range of 50 to 860 MHz that first enter a downstream receiver and demodulator 502. Regardless of where the echo device is located, it listens for and intercepts data packets that have its MAC address. The next functional component in an echo device is the media access control and echo logic block 504. This component assigns the test data packets new addresses corresponding to the CMTS MAC block 302 so that the data packets will be sent to the packet checker 306. Echo logic block 504 does not alter the data contents of the data packets but simply repackages them with new headers specifying the new source and destination information. Upstream modulator and transmitter 506 then modulates the radio frequency to the range of 5 to 42 MHz and transmits the test data packets to the packet checker. In a preferred embodiment receiver 502 and transmitter 506 are simply comparable components employed in a conventional cable modem.

As mentioned, the echo device as shown in FIG. 3 can be either internal to the CMTS or can be located outside the CMTS on the cable network as shown generally in FIG. 4. When the echo device is internal to the CMTS, it is essentially transparent and is implemented as part of the CMTS hardware (although it always has its own MAC address). While an echo device test set up as described above captures essential components of such a system, it should be understood that those components may be situated within a considerably more complex conventional cable system. In most installed cable systems, a splitter splits the downstream content, distributing it to several fiber nodes. One of the streams contains the echo device. Before entering the echo device, the downstream path goes through a high pass filter. The other streams from the splitter are directed to other fiber nodes and are sent downstream. The echo device is on the wire listening for packets addressed to it. As explained, the echo device essentially echoes the packets back to the packet checker in the CMTS at a lower frequency, thus, the need for the high pass filter. Another component in the echo device test set is an attenuator which acts as a cable and essentially prevents overload of the upstream channel. Also, in the echo device test set up, the downstream frequency is set in the upconverter and the upstream frequency is set in the echo device. Both are programmed for the same frequency.

Figure 6A:
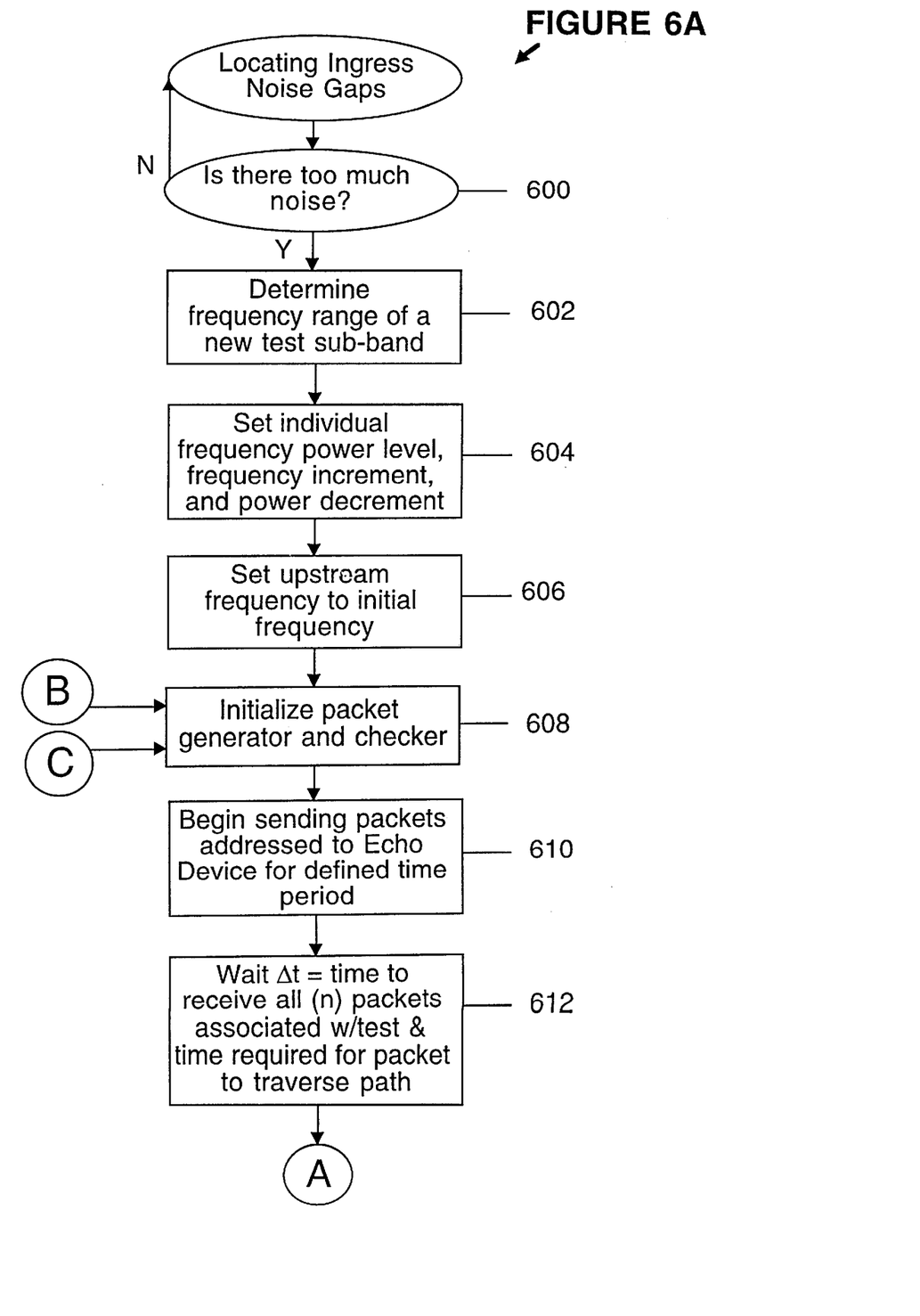
FIGS. 6A and 6B are flowcharts showing a method of locating ingress noise gaps on an upstream path as stated in the described embodiment.
Figure 6B:
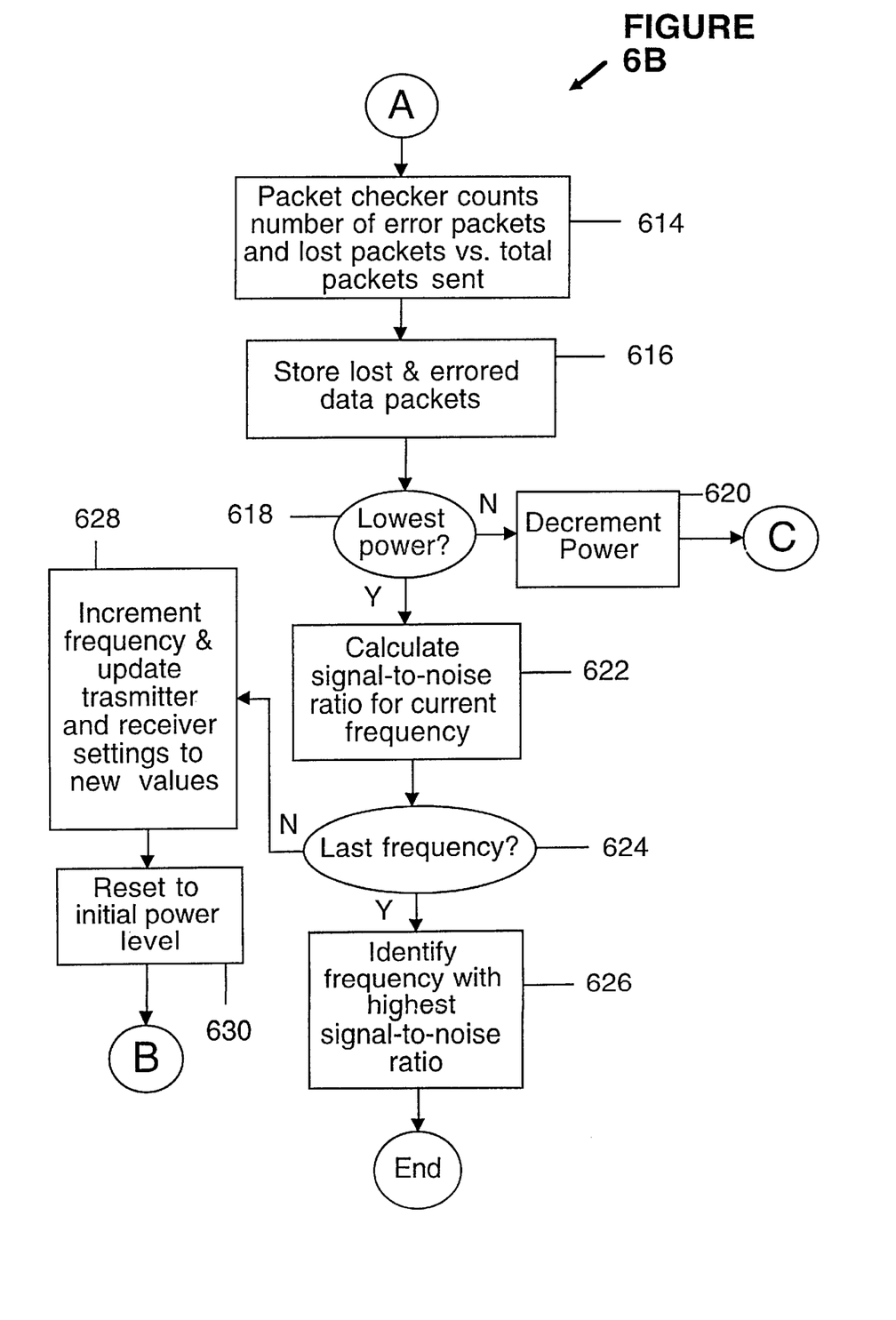

FIGS. 6A and 6B are flowcharts showing a method of locating ingress noise gaps on an upstream path as stated in the described embodiment. The described method can run at all times (continuous operation) or can be executed only upon suspicion that there is too much noise in the cable system (discrete operation). Further, the flowchart describes essentially an operational flow assuming that the devices, such as the CMTS and the echo device, are in working condition. The primary purpose of the method described is to find a frequency band slice with the least amount of noise, i.e., an ingress noise gap.

In a step 600 the system checks to see whether there is too much noise in the cable system. If the noise level is acceptable, the system is in a wait state and continues to check the noise level. If there is too much noise in the system, i.e. the signal-to-noise ratio is below an acceptable amount, the system proceeds to a step 602 where a new test sub-band is selected. In the described embodiment the frequency range of the sub band which is determined in step 602 is within 5 to 42 MHz, the frequency range of the upstream path. The sub-band itself can be in any range but is typically small, e.g. 100 KHz to 3.2 MHz. Because the full range of upstream frequencies is a shared system, the frequency range of the cable modem system would be allocated a certain range within 5 to 42 MHz. For example, the range above 35 MHz might be allocated to set top boxes. In such cases, the sub-band selected in step 602 will be somewhere within the range of 5 to 35 MHz.

In step a 604 the system sets the cable modem transmit frequency and the CMTS receive frequency to be the same. The power level is also initially set at step 604, as is a power level decrement value. Note that the power level is initially set to a high level and then decremented (at the selected frequency) to determine the carrier-to-noise ratio. The power is decremented by the set amount from a high to low level for each new frequency. After the carrier-to-noise ratio for a given frequency is identified, a new frequency must be selected and subjected to the same analysis. The new frequency is set according to the, a frequency increment as shown at step 604.

In a step 606 the system sets the frequency of the upstream carrier to the initial frequency. In a step 608 the system activates and initializes the packet generator and packet checke. At this point the packet generator begins sending test data packets. In step 610 the packet generator begins sending test data packets addressed to the echo device for a defined time period. Then at a step 612, the packet checker receives "echoed" test packets for a period of time equal to ΔT. One way to derive this time period is to take the sum of the time needed to accumulate all the test packets that were sent by the packet generator and received by the packet checker, plus the time delay for the last packet as indicated in a step 612. The time delay for the last packet is the time it takes for the packet to leave the packet generator and reach the packet checker.

In a step 614 of FIG. 6B, the packet checker conducts an error analysis using the number of lost packets never received and the number of "errored" packets received and the total number of packets sent. It saves the error statistics in an array or database for the frequency being analyzed. A final analysis is done when all the frequencies have been checked as discussed in greater detail with respect to step a 628. The system stores the lost and errored data packets in a step 616.

In a step 618 of FIG. 6B, the system checks to see whether the lowest power level has been reached. If it has not been reached, in a step 620 the power level is decremented by the amount set in step 604 and the system returns to step 608 where the system reinitializes the packet generator and checker for the new power level. The system then repeats steps 610 to 618 as described. If the lowest power level has been reached the system calculates the signal-to-noise ratio for the present frequency in a step 622. The system then checks whether another frequency can be checked in a step 624. If the last frequency has been reached, the system analyzes all the data to find an ingress noise gap by identifying the frequency with the highest signal-to-noise in a step 626. At this point the process is complete.

Returning to step 624, if the last frequency has not been reached, control transfers to a step 628 where the system increments the frequency to a new current frequency. The associated hardware, such as the echo device transmitter and the CMTS receiver, must be set to reflect the new frequency in order to process it. In a step 630, the system resets to the initial power level as set in step 604. The process then continues with steps following step 608 until step 618 as described where the system checks to see whether the lowest power level for the new frequency has been reached.

Thus, the flowcharts describe the process wherein error statistics for each power level for each frequency is checked before a determination is made as to which frequency has the best or the highest signal-to-noise ratio. That is, for each frequency all power levels are checked beginning typically with the highest power level down to the lowest. After all frequencies have been checked, the system determines which has the best signal-to-noise ratio, taking into consideration the power level.

In sum, HFC cable system, the coaxial cable portion of the system is the portion that receives the most ingress noise. As mentioned above, ingress noise can come from various sources ranging from electrical arching from machinery to various types of radio transmissions. The present invention addresses the issue of avoiding ingress noise on a cable modem upstream carrier by locating ingress noise gaps and positioning an upstream data carrier in one of the gaps.

Although the foregoing invention has been described in some detail for purposes of clarity of understanding, it will be apparent that certain changes and modifications may be practiced within the scope of the appended claims. Furthermore, although only a few embodiments of the present invention have been described, it should be understood that the present invention may be embodied in many other specific forms without departing from the spirit or the scope of the present invention. For example, the echo device can be located within the CMTS or anywhere on the downstream path including a subscriber's home. In another example, the echo device itself can be a cable modem with a special MAC address or a custom-built device located on the cable system.

What we claim is:

1. A system for identifying a transmission frequency for transmitting digital data upstream in a cable system, said transmission frequency having relatively less noise than at least some other frequency bands, the system comprising:
   a packet generator capable of generating a test packet;
   a rate controller for controlling a packet generation rate of the packet generator such that a downstream packet rate does not exceed the packet rate capacity of the upstream path;
   an echo device capable of receiving the test packet sent downstream and redirecting it upstream at a selected test frequency;
   a demodulator which can receive the test packet sent upstream at the test frequency; and
   a packet checker which can receive and analyze the test packet sent upstream to assess the amount of noise on the test frequency.

2. A system as recited in claim 1, wherein the system is a cable modem termination system.

3. A system as recited in claim 1, further comprising a rate controller which controls the rate at which test packets are sent downstream so that they are not sent downstream at a faster rate than an upstream data transmission rate.

4. A system as recited in claim 1, wherein the echo device and the demodulator are capable of transmitting the test packet at a plurality of test frequencies.

5. A system as recited in claim 1, wherein the packet generator and the packet checker are contained in a media access control device.

6. A system as recited in claim 1, wherein the echo device has a unique media access control address.

7. A system as recited in claim 1, wherein the packet generator is capable of partitioning a quasi-random bit stream to create test packets.

8. A system as recited in claim 1, wherein the packet generator is capable of creating test packets from Internet protocol ping packets.

9. A system as recited in claim 1, wherein the packet checker assesses the signal to noise ratio of the test frequency using an error statistic accumulator capable of accumulating statistics including a bit error rate, forward error collection block statistics, and packet error statistics.

10. A system as recited in claim 3, wherein the rate controller is contained in the media access control device.

11. A system as recited in claim 3, wherein the rate controller inserts non-data filler between downstream test packets to control the rate of test packets transmitted to the echo device.

12. A system as recited in claim 1, wherein the echo device is a subscriber cable data modem configured to receive the test packet sent downstream and redirecting it upstream at the selected test frequency.

13. A system as recited in claim 1 wherein the echo device is located within a cable modem termination system and receives intermediate frequency signals.

14. A system as recited in claim 1, wherein the echo device includes:
   a media access control address;
   a downstream receiver and demodulator device capable of intercepting downstream test packets addressed to the echo device and of forwarding the test packets;

an echo logic device for replacing the media access control address of the echo device contained in the test packet with the media access control address of the packet checker; and an upstream modulating and transmitting mechanism for transmitting the data packet.

15. A system as recited in claim 1, further including a mechanism for decrementing the power of the test frequency for use in assessing the signal to noise ratio for the test frequency.

16. A system as recited in claim 1, wherein the test frequency is greater than 5 megahertz and less than 42 megahertz.

17. A system as recited in claim 1, wherein an upstream channel bandwidth within the test frequency is greater than 200 kilohertz and less than 3.2 megahertz.

18. A cable modem device configured for use in a variable carrier frequency loop testing system, the device comprising:

a demodulator for receiving and forwarding a downstream test packet wherein the test packet has a media access control address of the cable modem device;

an address manipulation device which replaces the media access control address of the cable modem device with a media access control address of a test packet checker device without modifying any other portion of the test packet; and a modulator for transmitting the test packet upstream to the test packet checker.

19. A method of identifying a transmission frequency for transmitting digital data upstream in a cable system, said transmission frequency having relatively less noise than at least some other frequency bands, the method comprising:

(a) selecting a test frequency;

(b) transmitting test data at a downstream frequency, the test data being addressed to an echo device located downstream on the cable system;

(c) receiving test data sent by said echo device at the test frequency;

(d) determining a noise level associated with the test frequency by evaluating the received test data; and (e) repeating steps (a) through (d) for a plurality of test frequencies to identify the transmission frequency.

20. A method as recited in claim 19 wherein the step of selecting a test frequency includes:

initializing the test frequency to an initial value;

initializing a power level; and setting a frequency increment value.

21. A method as recited in claim 19 wherein the step of determining a noise level includes:

determining the number of errors in the test data by analyzing the test data received by a test data receiver, the test data receiver being part of a destination node;

storing in memory the number of errors in the test data; and calculating the signal-to-noise ratio for the test frequency.

22. A method as recited in claim 19 including determining whether the lowest power for the test frequency has been reached.

23. A method as recited in claim 19 wherein the test data is in the form of test data packets.

24. A method as recited in claim 19 wherein the test frequency is set to a value greater than 5 megahertz and less than 42 megahertz.

25. A method as recited in claim 19 wherein the test data is sent to the echo device for a pre-determined length of time.

26. A method as recited in claim 19 wherein a pre-determined amount of test data is sent to the echo device such as a fixed number of data packets or a fixed number of bits.

27. A method of identifying a frequency channel for transmitting digital data upstream in a cable system, the method comprising:

(a) selecting a test frequency;

(b) generating a test data stream containing a plurality of bits;

(c) transmitting said test data stream from a second point on the cable system downstream to a first point on the cable system;

(d) receiving said test data stream at the second point located upstream from said first point on the cable system;

(e) evaluating the condition of said test data stream at said second point to assess a noise level at said selected frequency;

(f) repeating steps (b) through (e) for a plurality of test frequencies; and (g) determining which of said plurality of test frequencies contains the least noise.

28. A method as recited in claim 27, further comprising:

prior to transmitting said test data stream upstream, transmitting said test data stream from a transmitter downstream to said first point.

29. A method as recited in claim 27, wherein said first point is an echo device which receives the test data stream coming downstream and re-transmits it upstream to said second point.

30. A method as recited in claim 27, wherein the packet checker assesses the signal-to-noise ratio of the test frequency using an error statistic accumulator capable of accumulating statistics including a bit error rate, forward error collection block statistics, and test data packet error statistics.

* * * * *

UNITED STATES PATENT AND TRADEMARK OFFICE
CERTIFICATE OF CORRECTION

PATENT NO. : 5,943,604

DATED : August 24, 1999

INVENTOR(S) : Wei-Sing Chen and Guenter E. Roeck

It is certified that error appears in the above-identified patent and that said Letters Patent are hereby corrected as shown below:

Column 6, Line 4, please replace "RP" with --RF--.

Signed and Sealed this

Seventeenth Day of April, 2001

*Attest:*

NICHOLAS P. GODICI

*Attesting Officer*     *Acting Director of the United States Patent and Trademark Office*